Sept. 13, 1960     A. B. CHANDLER     2,952,258
APPARATUS FOR THE COLLECTION AND TESTING OF BLOOD Filed Oct. 29, 1958

INVENTOR.
ARTHUR B. CHANDLER
BY
John Gibson Semmes

United States Patent Office 2,952,258
Patented Sept. 13, 1960

2,952,258

APPARATUS FOR THE COLLECTION AND TESTING OF BLOOD

Arthur B. Chandler, 709 Highland Ave., Augusta, Ga.

Filed Oct. 29, 1958, Ser. No. 770,336

3 Claims. (Cl. 128—276)

The present invention relates to the collection and testing of blood and other body fluids, particularly an unitary apparatus for collecting and testing blood without exposure to air or other foreign substance, except the inner walls of the collection device. Principal applications of the apparatus are in the testing of coagulation and thrombus formation characteristics of blood.

Numerous previous inventors have constructed separate devices for the collection or drawing of blood and testing of same. Usually, blood is drawn from the human vein by means of a hollow needle and syringe, then is injected into a separate testing device. Significantly, none of these inventors have devised means for drawing of blood without exposure to air or other foreign substance and none have devised an unitary apparatus for collection as well as testing of the blood. According to the present invention, blood is drawn through a hollow needle into a collapsible polyvinyl plastic tube which, itself, serves as a testing vehicle. Manifestly, other types of collapsible tubes may be employed. Within the collapsible tube blood may be exposed controlledly to air and/or liquid or vaporous testing materials. The present apparatus may be employed in series so that several tubes may be filled simultaneously, then disengaged for separate testing.

For purposes of clarification, it is believed appropriate to define the various characteristics of blood which may be studied by the instant apparatus. As is well known, a blood clot (coagulated blood) is the result of precipitation of fibrin in the blood and results when blood is converted from liquid to solid state. A thrombus is the precipitation of fibrin plus cellular elements in a moving stream of blood, and may be defined simply as a blood clot that forms during life. Thus, a thrombus forms while blood is flowing and results in an organized structure. However, an ordinary or simple blood clot may also form during life in a stagnant or stationery column of blood such as might result from tying off a blood vessel.

According to the present invention, a collapsible tubular container having outwardly extending inlet and outlet ports is employed. Collapsible ancillary tubing extends from the ports. Attached to the inlet ancillary tube is a hollow blood-collecting needle. Attached to the outlet ancillary tube may be vacuum means for drawing of blood or the inlet ancillary tube of another blood collecting and testing collapsible tubular container. Encircling the ancillary tubing adjacent the ports are clamp closure means and encircling the collapsible tubular container are similar clamp closure means which may isolate in the container collected blood, as well as vaporous or other testing substance. For study of thrombus, as well as coagulation, the ends of the container may be joined by means of a collar or sleeve so that the container is of annular formation.

In use blood is collected by means of a hollow needle into the annular container. Clamp closure means are then applied to the inlet and outlet ancillary tubes and the needle and extraneous ancillary tubing may be severed. The blood-filled container may then be used as a vehicle for testing the blood. Manifestly, trauma to blood so collected in minimized. The smooth inner formation of the collapsible container approximates the human blood vessel and, as described below, permits a testing in vitro for thrombus formation.

Accordingly, an object of invention is to provide a device for studying blood thrombus in vivo.

Another object is to provide a device for study of blood without prior exposure to air or foreign substances, except the walls of the collecting device.

Another object of invention is to provide a blood collecting device which minimizes trauma to cells and other constituents of blood.

Another object of invention is to provide a means for collecting blood wherein a predetermined amount of blood may be accurately collected directly within the testing device itself.

Another object of invention is to provide a blood collecting device wherein the blood may be exposed controlledly to air, vaporous, liquid or solid testing materials.

Another object of invention is to provide a blood collecting device which may be employed in series so that several testing containers can be filled with a single venipuncture.

Another object of invention is to provide a blood testing device having auxiliary ports of accessibility through which testing materials may be introduced and portions of the blood undergoing test may be withdrawn for intermediate study.

Yet an additional object of invention is to provide in a blood testing device a tubular annulus which is similiatory of a human blood vessel.

Yet additional objects of invention will become apparent from the ensuing description and attached drawings wherein.

Figure 1:
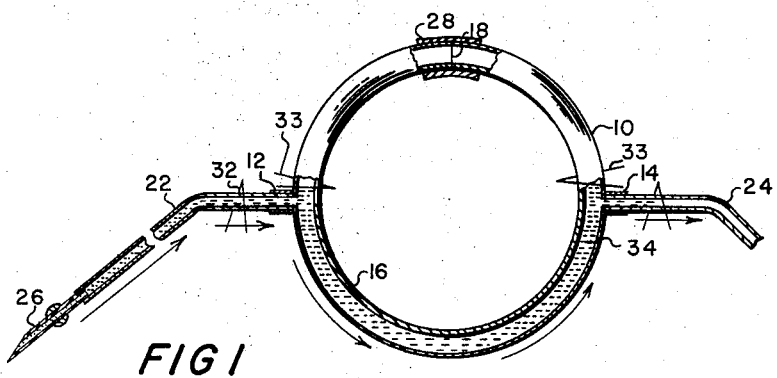
Figure 1 is a side elevation, partially in section, of a collapsible tubular container having ends joined and forming an annular blood collecting and testing device according to the present invention.

In Figure 1 a collapsible tubular container, generally designated as 10, is illustrated as having collapsible walls 16, outwardly extending inlet port 12 and outlet port 14. Ports 12 and 14 may be attached to container 10 by means of a plastic solvent. The container ends 18 are joined by means of sleeve 28 which may be sealed to the tube ends 18 my means of plastic solvent to make an airtight junction. Ancillary collapsible tubes 22 and 24 are fitted, respectively, in inlet and outlet ports 12 and 14. As will be apparent, ancillary tubes 22 and 24 may be fitted over said ports or may be joined directly to said ports by means of a sleeve such as sleeve 28 employed in joining together annulus ends 18, as illustrated in Fig. 1. All such fittings or joinings may be made with a plastic solvent. Fitted within ancillary tube 22 is hollow needle 26, which is the veni-puncture instrument. Blood drawing means or the inlet ancillary tube 22 of another blood collecting and testing container may be attached to ancillary tube 24. Ancillary tube closure clamps 32 are exteriorly attached to the ancillary tubing. Similar closure clamps 33 are exteriorly attached to the container walls 16. Thus, the collected blood is confined within container 10 by closure clamps 32. Within container 10 collected blood may be isolated by closure clamps 33. As will be apparent, container 10 has a smooth inner surface not interrupted by valves. Closure clamps are employed to achieve this unique inner surface. Air and vaporous, solid and liquid testing materials may be confined within the container apart from the collected blood.

Figure 3:
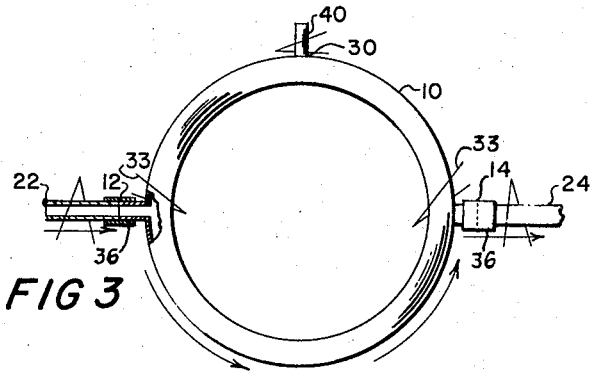
Figure 3 is a modification of Figures 1 and 2 wherein the annulus has an auxiliary port of accessibility.

Inlet and outlet ports 12 and 14 might be replaced with solid plastic studs. Then, container 10 might be entered by piercing the solid inlet and outlet studs with a hollow needle to which ancillary tubing could be attached. Or, as illustrated in Figure 3 ancillary tubing might be attached to the outlet ports by means of a sleeve 36 or the like.

Figure 2:
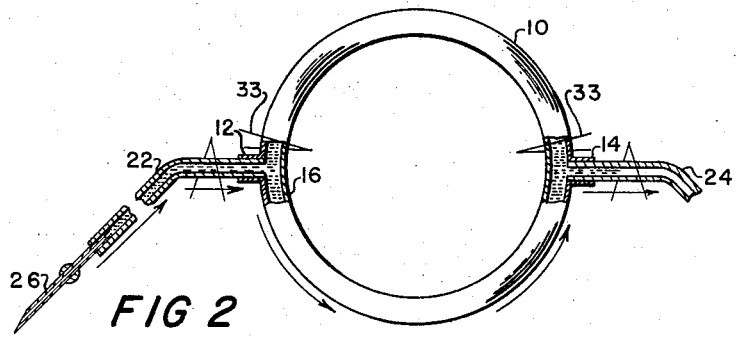
Figure 2 is a blood collecting and testing device comprising an annulus which may be molded or hand-fashioned, according to present techniques.

Container 10 including ports 12 and 14, as illustrated in Figure 2 may be molded or hand formed as an entity, instead of joining the two ends 18 of the container 10. Container 10 illustrated in Fig. 3 has an auxiliary accessibility port 30, controlled by ancillary tubing 40 and closure clamp 42, for the introduction of testing materials or for withdrawal of blood during testing. Container 10 must be constructed of collapsible material. This is because in blood collecting and testing devices constructed of glass or other rigid material elaborate valving and closure means are necessarily employed. Since the annular container has an inner surface uninterrupted by valves it may be employed uniquely in the study of thrombosis in vitro.

According to the present invention blood is collected for testing without prior exposure to air and, therefore, the clotting or coagulation process is slowed considerably. Thus, the collected blood may be maintained in a fluid state for a longer period of time than blood exposed to air without the addition of anticoagulant drugs which alter the composition of the blood. Conventionally, studies of blood clotting are carried out in glass or plastic tubes which render difficult, if not impossible, the controlled introduction of air, and testing materials onto the blood. Usually whole blood is withdrawn from a human vein by a needle and syringe and then introduced into a testing container.

According to the present invention blood clotting may be studied by utilizing the annular container. Thus, in utilizing the annular container (as illustrated in Figs. 1, 2 and 3) the effects of various gases, including vaporous, liquid or solid test materials, on the clotting of blood may be studied by initially temporarily removing one or both of the container clamps 33 which separate the blood column from the empty portion of the container. The test material is then trapped in the non-blood containing part of the container and clamped off before the remaining portion of the container is filled with collected blood. One or both of the container clamps 33 are then removed to permit exposure of the blood to test material.

Thrombus formation may be studied by utilizing the annular container (illustrated in Figs. 1, 2 and 3). After filling approximately one-half of container 10 with blood 34, ancillary clamps 32 are secured and said container is placed and centered upon a slanted turntable. Container closure clamps 33 are removed and the turntable with the circular container attached is rotated. The column of blood, except for the small amount of blood retained in inlet and outlet tubes 22 and 24, slides along the wall 16 of the tube as it rotates. After a period of time, a thrombus forms in the annular container. With this device a thrombus can be produced in the environment of any gas or combination of gases, including air, which had been previously trapped in the non-blood containing part of the annular container.

Manifestly, modifications in the details of construction, materials, dimensions and arrangements of parts herewith shown and described may be made without departing from the spirit of the invention which is claimed as follows:

1. A blood collecting and testing device comprising a collapsible tube having its ends joined so as to form a tube annulus and having opposed outwardly extending inlet and outlet ports, collapsible ancillary tubing attached to said ports, a blood-collecting needle attached to said inlet port ancillary tubing, clamps closure means exteriorly attached to said ancillary tubing and clamp closure means exteriorly attached to said tube annulus intermediate said ports.

2. A blood collecting and testing device comprising a collapsible tube annulus having outwardly extending inlet and outlet ports, collapsible ancillary tubing attached to said ports, a blood-collecting needle attached to said inlet port ancillary tubing, clamp closure means exteriorly attached to said tube annulus intermediate said ports.

3. A blood collecting and testing device comprising a collapsible tube annulus having outwardly extending inlet and outlet ports and intermediate said ports an auxiliary inlet port, said auxiliary port being for introduction of test material into said tubing, ancillary tubing attached to said inlet, auxilliary and outlet ports, clamp closure means exteriorly attached to said ancillary tubing, and clamp closure means exteriorly attached to said tube annulus intermediate said inlet port and said auxiliary port and intermediate said auxiliary port and said outlet port.

References Cited in the file of this patent

UNITED STATES PATENTS

| | | |
|---|---|---|
| 2,697,435 | Ray | Dec. 21, 1954 |
| 2,702,034 | Walter | Feb. 15, 1955 |
| 2,816,545 | Jacoby | Dec. 17, 1957 |
| 2,848,999 | McGrew et al. | Aug. 26, 1958 |

FOREIGN PATENTS

| | | |
|---|---|---|
| 456,905 | Germany | Mar 3, 1928 |